Fig. 1.

INVENTORS
HAROLD B. SOULE
GORDON W. SMITHSON
BY
ATTORNEY

Fig. 4.

INVENTORS
HAROLD B. SOULE
GORDON W. SMITHSON
BY
ATTORNEY

INVENTORS
HAROLD B. SOULE
GORDON W. SMITHSON
BY
ATTORNEY

INVENTORS
HAROLD B. SOULE
GORDON W. SMITHSON
BY

ATTORNEY

Patented Feb. 16, 1954

2,669,006

UNITED STATES PATENT OFFICE 2,669,006

INDEXING MECHANISM FOR TURRET LATHES

Harold B. Soule, Barrington, and Gordon W. Smithson, Pawtucket, R. I., assignors to Niles-Bement-Pond Company, West Hartford, Conn., a corporation of New Jersey Application January 4, 1949, Serial No. 69,184

8 Claims. (Cl. 29—49)

This invention relates to turret lathes, and more particularly relates to turret indexing mechanism and to the control of the turret indexing.

Frequently it is desired to provide machine tools with indexible turrets of large proportions to carry heavy tools which extend far out from the turret, sometimes as much as three feet, and large turrets and the weights and leverage effect of heavy tools thereon which extend far out therefrom present obstacles to smooth, quick and precision indexing.

A principal object of my invention is to provide an improved turret indexing mechanism which is not only capable of indexing effectively and satisfactorily turrets of the medium and smaller sizes but is also capable of indexing smoothly, quickly and positively into precision positions turrets of large sizes and turrets carrying heavy tools which extend far out from the turret; and to provide indexing mechanism of this character which will index the turrets to and hold the turrets firmly and steadily in precision indexed positions without setting up strains which would be damaging to the machine or tend to impair its accuracy.

Another object of this invention is to provide turrent indexing mechanism of the character just mentioned that incorporates novel and improved mechanism which permits indexing of the turret while the turret-slide is in its extreme backward position and not in motion and permits the indexing of any selected number of faces prior to the advance of the turret-slide toward the spindle, whereby the turret may be indexed past turret faces which may carry no tools or are not desired to be used, so that reciprocation of the turret-slide with such idle turret faces toward and from the spindle nose is not required before another turret face, which carries tools desired to be used, is indexed.

Another object of this invention is to provide, for lathes, a turret indexing mechanism of the character described wherein there is a cam-drum, or equivalent means, for reciprocating the turret-slide and which does not require a dwell on the cam-drum during the indexing operation of the turret and, consequently, more surface of the cam-drum is available for feeding operations and greater length of feed may be had at an easier feeding angle of the cam-drum track.

Another object of this invention is to provide an indexing mechanism of the character described which is controllable in such a way that, when desired, the turret-slide may be reciprocated either during the cycle or machine operation or at other special times without indexing of the turret taking place.

Another object of this invention is to provide turret indexing mechanism of the character described which comprises sturdy and durable parts and in which replacement of parts is facilitated.

Another object of this invention is to provide a control for a turret indexing motor whereby the turret may be indexed to any one of its indexible positions from any other index position without requiring traverse feed of the turret or its slide; and another object of this invention is to provide a turret index motor control which operates automatically to index the turret to the desired index stations in the sequence desired, the control preferably being settable whereby the stations desired and the desired sequence may be preselected.

Another object of this invention is to provide turret index motor control so associated with a control of the rapid traverse motor of a turret lathe that the rapid traverse motor will not operate while indexing of the turret is taking place.

A further object of this invention is to provide a turret indexing motor control which is positive, quick and reliable in action and is quickly, positively and reliably responsive to either manual or automatic actuation.

Other objects of this invention will be in part obvious and in part pointed out hereinafter.

As is customary with most turret lathes, the turret-slide is reciprocated with "feed" motion (a slow motion during cutting operation) and with a "rapid traverse" motion (a fast or quicker motion when the turret slide is not in "feed" motion), this rapid traverse motion being obtainable in various ways from a power source or by a separate motor. In the present illustrations a separated rapid traverse motor is disclosed and described but the rapid traverse motion may be accomplished otherwise as is known in the art.

In accordance with this invention a turret mounted to turn on a central vertical axis is provided with a horizontally disposed worm gear of generous diameter concentric with the axis of the turret so that the distance between the worm gear teeth and the axis of the turret will have a generous leverage component for indexing the turret against opposition to indexing offered by the weight of the turret and the weight and leverage effect of the tools thereon when the worm gear and turret are rotated by a worm meshing with the worm gear. Further, a separate motor is provided for rotating the worm and, consequently, rotating the worm gear and turret. The turret indexing may be controlled by dogs on the main dog-drum of the machine and may be disconnected from said control by the dog-drum dogs and be controlled through other controls, as desired. Devices are associated with the turret indexing mechanism to releasably bind and lock the turret in a precision manner, in each indexed position to which the turret has been moved by the indexing mechanism, and are operated to perform their binding and locking operations synchronously with operation of the indexing mechanisms and the turret-slide reciprocating mechanism.

The control for the turret index motor is electrical and includes dogs on a control dog-wheel and a dog or dogs on the dog-drum of the machine, the dogs operating to adjust switches in the motor circuit to start and to stop the index motor to index the turret to the desired index stations in the desired sequence; this control preferably so controlling switches in a circuit to the rapid traverse motor (or its equivalent) of the machine that said rapid traverse motor cannot start while the indexing motor is running.

The invention accordingly consists in the features of construction, combinations of elements, arrangements of parts and methods of operation which will be pointed out hereinafter and the scope of the application of which will be set forth in the claims that follow.

In order that a clearer understanding of this invention may be had, attention is hereby directed to the accompanying drawings, forming a part of this application and illustrating certain possible embodiments of this invention, and in which.

Similar reference characters refer to similar parts throughout the several views of the drawings.

Figure 3:
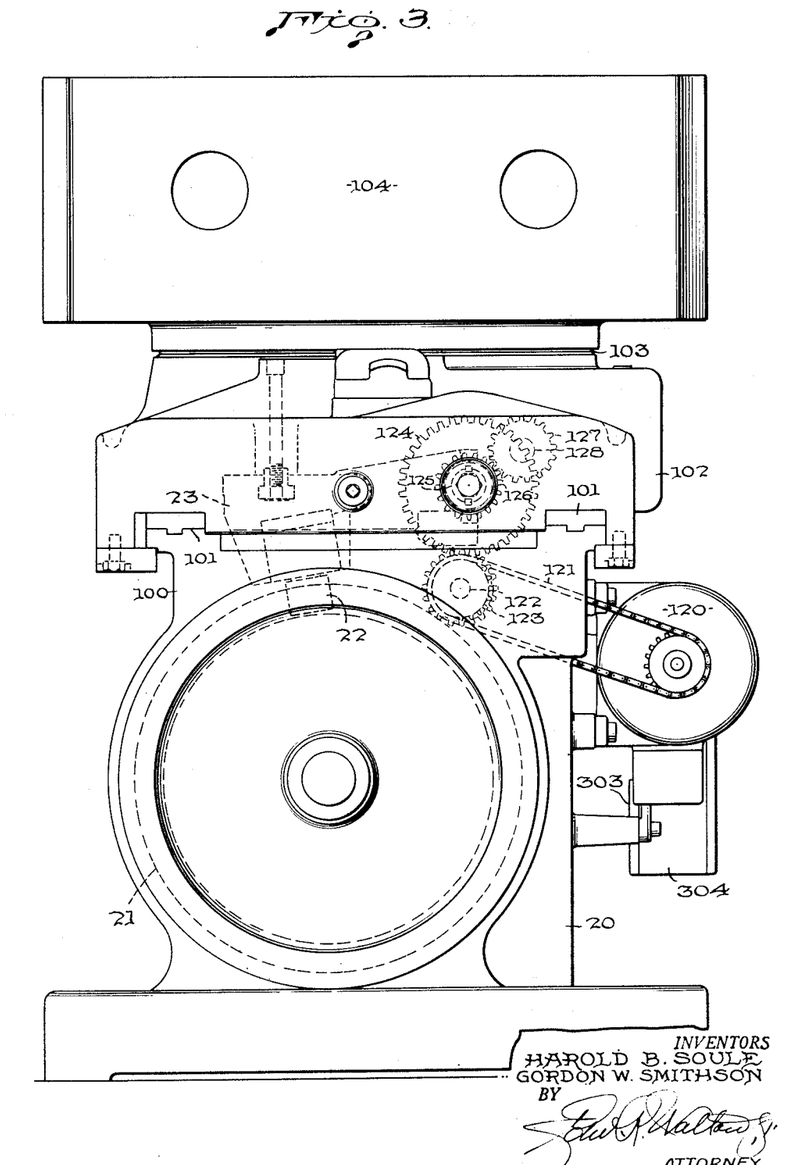
Figure 3 is an end view of the machine shown in Figs. 1 and 2 as viewed from the right of Figs. 1 and 2, certain concealed parts being indicated by dotted lines.
Figure 4:
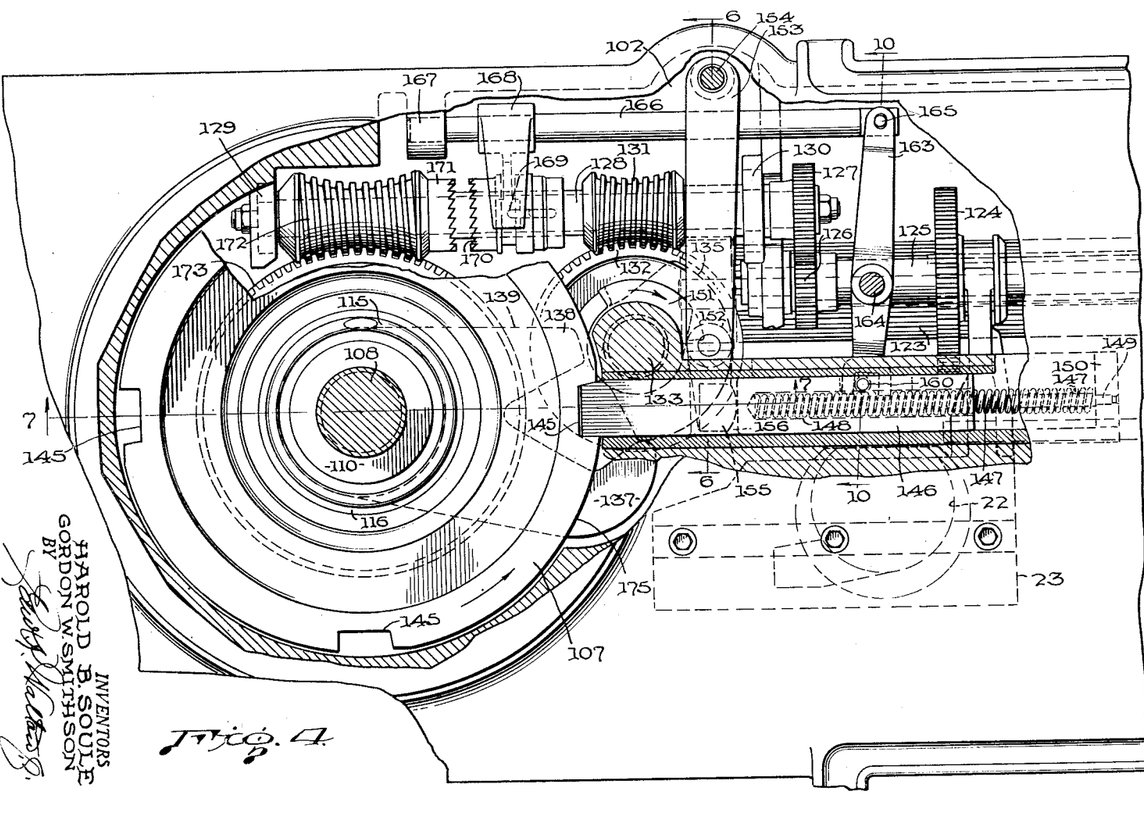
Figure 4 is a horizontal sectional view illustrating the mechanisms beneath the turret and looking down, and is taken substantially on the plane of line 4—4 of Fig. 2.

This invention relates broadly to machine tools and particularly to automatic turret lathes but, since the invention is specifically related to turret indexing mechanism and its control, it is deemed unnecessary to illustrate an entire machine tool and, therefore, in the drawings there is shown only as much of the turret-slide portion of an automatic turret lathe as is required to fully and clearly illustrate the features of construction, combinations of elements and arrangements of parts which may constitute one possible embodiment of this invention. Accordingly, in the drawings, and to which reference is now made, only a portion of the turret-slide section of the turret lathe is shown. The base 29 of the machine is usually a heavy casting adapted to support and contain other parts of a machine tool at suitable elevations and has a flat or tablelike upper surface that provides the bed 100 for the turret-slide 102 and has a hollow interior that houses various mechanisms including the turret-slide actuating cam-drum 21 (see Fig. 3) having an operative connection with the turret-slide by means of a cam-follower 22 suitably mounted, as at 23, on the under side of the turret-slide, whereby the latter may be reciprocated by said cam-drum.

Figure 2:
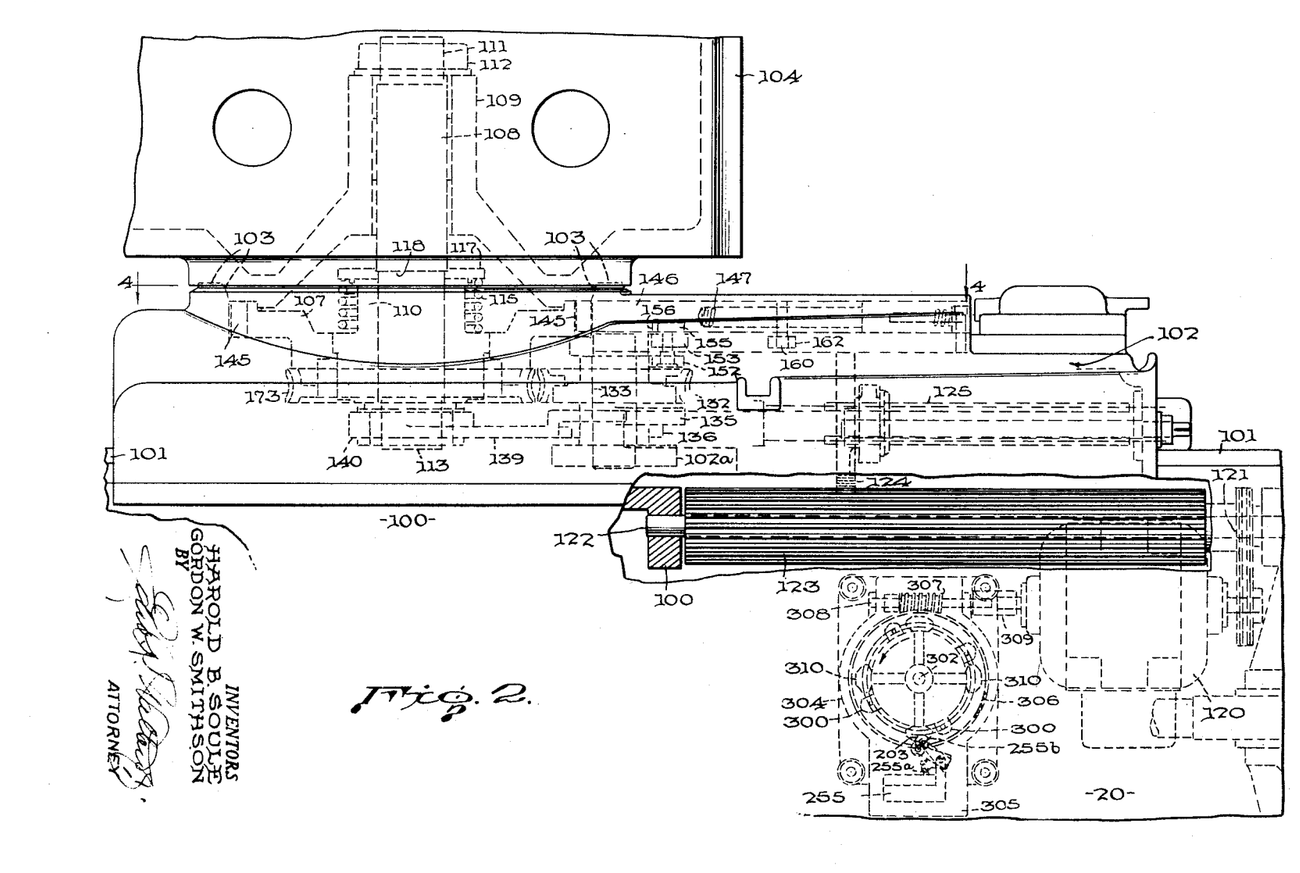
Figure 2 is a front elevation of the machine shown in Fig. 1 with certain parts being broken away and others indicated by dotted lines.
Figure 5:
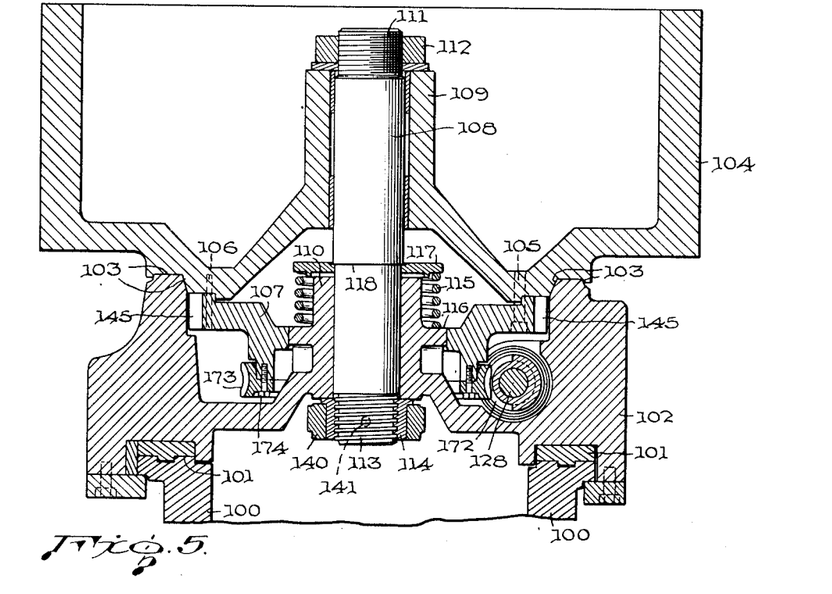
Figure 5 is a vertical sectional view taken transversely through the turret and turret-slide substantially on the line 5—5 of Figure 1.

As is usual in turret lathes of this type, the bed 100 is provided with slideways 101 on which the turret-slide 102 reciprocates to move the turret toward and away from a rotatable spindle (not shown). The turret slide 102 is a hollow casting open on its under side between said ways 101 and provided on its upper side or wall (near its forward end) with an annular combination flat top and internal tapered bearing surface 103 on which the turret 104 rests for rotation thereon (see Figs. 2, 5 and 7). To the underside of turret 104 is secured, as by bolts 105 and dowel pins 106, a locking plate or disc 107. The turret and its locking plate are rotatable about a stud shaft 108 which extends through a bore in a central boss 109 of the turret 104 and a bore in a central boss 110 of the turret-slide 102, the upper end 111 of stud 108 being threaded and protruding from boss 109 and carrying a nut 112, and the lower end 113 of the stud 108 also being threaded and carrying a binder nut 114. The binder nut 114 co-acts with a compression spring 115 encircling the boss 110 and is compressed between an annular surface 116 of the slide 102 and a collar 117 above surface 116 which is confined on the stud 108 by an overlapping shoulder 118 on said stud. Thus, when the nut 114 is tightened on the stud 108, the turret is drawn down on and binds the turret to bearing surface 103 of the slide 102 and, when loosening the nut 114 on stud 108, spring 115 is allowed to elevate stud 108 relatively to the turret to the extent permitted by the amount of loosening of nut 114 and thus unbinds and loosens the turret on its bearing 103 so that the turret may be freely rotated on the slide for indexing. The means for tightening and loosening binder nut 114 will be described hereinafter.

The power for indexing the turret may be, as shown, a separate electric motor 120 supported in any suitable manner on the machine base 20 and drives, as through belt or chain 121, a shaft 122 rotatably mounted within the machine base longitudinally of the movement of the turret-slide 102 and carrying a long pinion 123 keyed thereon. As shown in Figs. 1, 2, 3 and 4, a castellated shaft 125 is disposed within the turret-slide longitudinally of its movement and is rotatably journalled in suitable bearing on the turret-slide and a gear 124 is splined on the castellated portion of said shaft and slidingly meshes with the elongated pinion 123 in all positions of the turret-slide on the machine bed. A gear 126, keyed to another portion of said shaft 125, meshes with a gear 127 keyed to a shaft 128 within the turret-slide 102, shaft 128 being journalled in suitable brackets 129 and 130 on the turret slide. The shaft 128 has mounted thereon two spaced worms 131 and 172 the former actuating the operating mechanism for the turret binding and locking devices and the latter indexing the turret which is accomplished upon engagement of the clutch 170—171, the said clutch being engaged and disengaged by the movement of the turret lock bolt 146.

Figure 7:
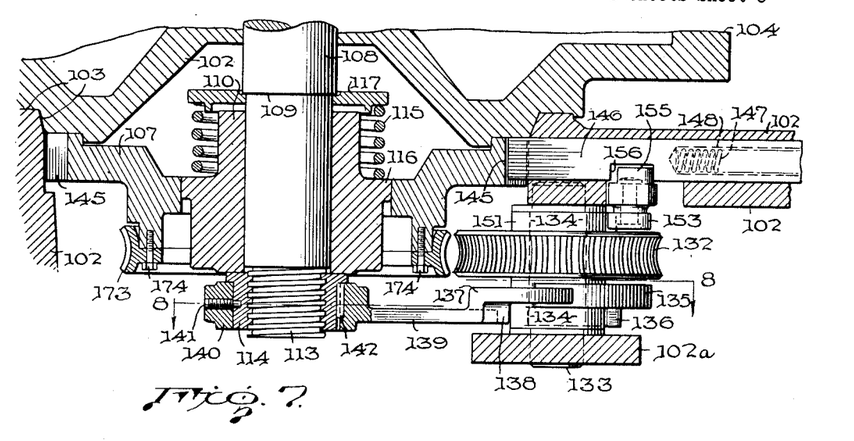
Figure 7 is a vertical longitudinal sectional view of the turret-slide and taken through the axis of the turret to illustrate a portion of the mechanism and showing a lower fragmental portion of the turret, and is taken on the line 7—7 of Fig. 4.
Figure 8:
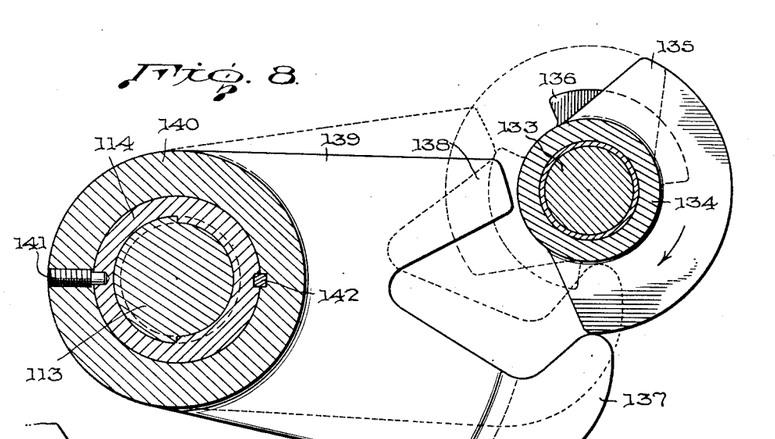
Figure 8 is a horizontal sectional view taken on the line 8—8 of Fig. 7.

The worm 131, keyed on shaft 128, meshes with a worm wheel 132 fixed to a hub or sleeve 134 rotatably carried on shaft 133 (Fig. 7). This hub presents a double cam having cam parts 135 and 138 which engage, respectively, two fingers 137 and 138 of a lever 139 which has a hub 140 attached, as by pin 141 and key 142, to the binder nut 114 on the turret stud 108. Nut 114 becomes tightened on the stud 108 as the rise of cam part 136 cams lever 139 in one direction and nut 114 in loosened on stud 108 as the rise of the other cam part 135 cams lever 139 in the opposite direction (see Fig. 8), thus alternately binding the turret to and unbinding the turret from the turret-slide.

Figure 9:
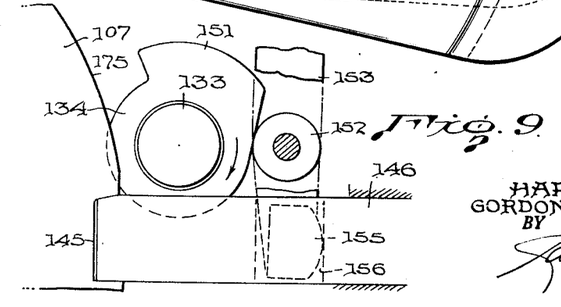
Figure 9 is a sectional view of a detail showing the locking bar operating cam and fragments of adjacent parts.

The turret locking disc 107 has formed on its periphery a number of notches 145 corresponding to the number of index positions (or faces) of the turret 104 and, when the turret is in any one of its index positions, a locking bolt 146 is adapted to enter and fit snugly in the corresponding notch of the locking disc to hold the turret securely and firmly in its precision indexed position. The locking bolt 146 is slidably housed in a slideway provided therefor in and under the top wall of the turret-slide 102 and the locking bolt is continuously urged toward the locking disc by a helical compression spring 147 which has its forward portion seated in a bore 148 therefor provided in the locking bolt and has its rearward portion abutting a fixed part of the turret slide part 150 and encircling a guide pin 149 secured to part 150. The locking bolt 146 is retracted by means of a rotating cam 151 on the cam hub or sleeve 134 (see Figs. 7 and 9) and engages a cam roller 152 carried on a lever 153 which at one end is pivoted on a pin 154 mounted on the turret-slide 102 and at its other end has a projecting nose 155 seated in a notch 156 provided therefor in the locking bolt; the lever 153 thus being moved alternately in opposite directions—i. e., by the cam 151 to retract the bolt 146 against the action of spring 147 and by the spring 147 which shoots the bolt 146 into one of the notches 145 of the locking disc when the lever 153 is released by the cam 151 and a locking notch comes into line with the locking bolt 146.

Figure 6:
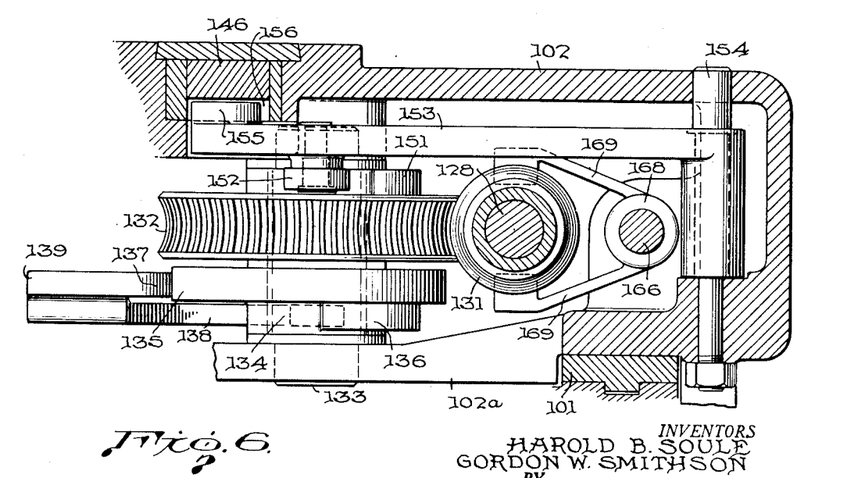
Figure 6 is a vertical sectional view taken transversely of the turret-slide to illustrate a portion of the mechanism and is taken substantially on the line 6—6 of Figure 4.
Figure 10:
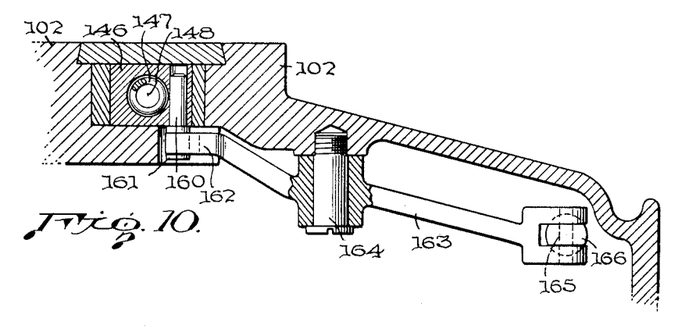
Figure 10 is a sectional view of another detail of the mechanism including the clutch operating lever and is taken substantially on the line 10—10 of Fig. 4.

Fixed to the locking bolt 146 is also a pin 160 (see Figs. 2, 4 and 10) having a projecting head 161 seated between the fingers of the bifurcated end 162 of a lever 163 which is centrally pivoted on a stud 164 mounted on the underside of the top wall of the turret-slide 102, the other end of lever 163 being rotatably pinned, as by pin 165, to one end of a rod or bar 166 slidably seated in a bracket 167 formed on or secured to the turret-slide. Rod 166 has the clutch yoke 168 (Figs. 1, 4 and 6) secured thereto and the arms 169 of the yoke engage one member 170 of a pair of complementary clutch members 170—171, member 170 being splined on shaft 128 for slidable movement into and out of clutching engagement with the other clutch element 171 fixed to the worm gear 172 which is rotatable with member 171 on shaft 128. This worm gear 172 is in mesh with a worm wheel 173 fixed, as by bolts 174 (Figs. 5 and 7) to the turret locking disc 107 so that when worm gear 172 rotates the turret rotates.

The double binder-nut-cam 135—136 and the locking-bolt-cam 151 are so shaped and positioned on the hub 134 of worm wheel 132 to effect the sequence of loosening the binder nut 114, retracting the locking bolt 146 which causes an indexing drive of the turret, and then the locking of the turret by the bolt 146 which discontinues the indexing drive of the turret and tightening the binder nut 114. The locking-bolt-cam 151 need not hold the locking bolt retracted until the next notch in the turret locking disc arrives opposite the bolt because, after the cam has retracted the locking bolt and the turret has started indexing rotation, the end of the locking bolt may be allowed to ride on the circular periphery 175 of the locking disc 107 and be held in retracted adjustment thereby until the next notch arrives opposite the end of the locking bolt.

When it is desired to index the turret, the sequence of operations is as follows: The motor 120 is started (as by a dog $d$ on dog-drum D, Fig. 13) imparting rotary motion to shaft 128, thus causing worm 131 to start rotating the cam sleeve on hub 134. This first causes binder-cam-part 135 to engage finger 137 of the binder lever 139 and move the lever to loosen nut 114 on the threaded end 113 of turret stud 108. Then continuing rotation of cam hub 134 causes locking bolt-cam 151 to displace lever 153 to retract the locking bolt 146 against the pressure of biasing spring 147, the bolt 146 in turn rocking lever 163 about its fulcrum 164 to shift slidable yoke rod 166 to engage clutch elements 170—171 and causing worm 172 to rotate the turret 104 toward the next index position. The locking-bolt is held 151 then releases lever 153 and the bolt is held retracted by the circular periphery 175 of the locking disc 107. When the next locking notch 145 of the locking disc registers with the end of the locking bolt 146, the spring 147 snaps the bolt into the notch and this movement of the locking bolt, acting through lever 163 and rod 166, disengages the clutch elements 170—171 and indexing of the turret stops. Now, the cam surface of the binder-cam-part 135 releases the finger 137 of the binder lever and the other binder-cam-part 136 engages the other finger 138 of the binder lever 139 and moves the lever (in a direction opposite to that by cam part 135) to tighten the nut 114 and to bind the turret against the bearing surface 103 of the turret-slide. If the motor 120 continues to rotate, the above sequence of operations will be repeated as long as the motor runs.

In the operation of automatic turret lathes, the indexing of the turret takes place when the turret-slide 102 is in its rearmost position on the bed of the machine—i. e., fully withdrawn from the work or tools, as the case may be, carried in a suitable chuck on the nose of the spindle—and, in most cases, the turret-slide 102 dwells in this position by reason of a cam dwell on the cam-drum 21. With the present invention minimum dwell is to be provided on the cam-drum 21 for this purpose, but instead the cam-drum will be stopped (as well as all movement of the turret-slide and of the machine control drum D) during the indexing of the turret, after the indexing operation has been started by the dog drum D shown in Fig. 13, when indexing is desired.

Figure 13:
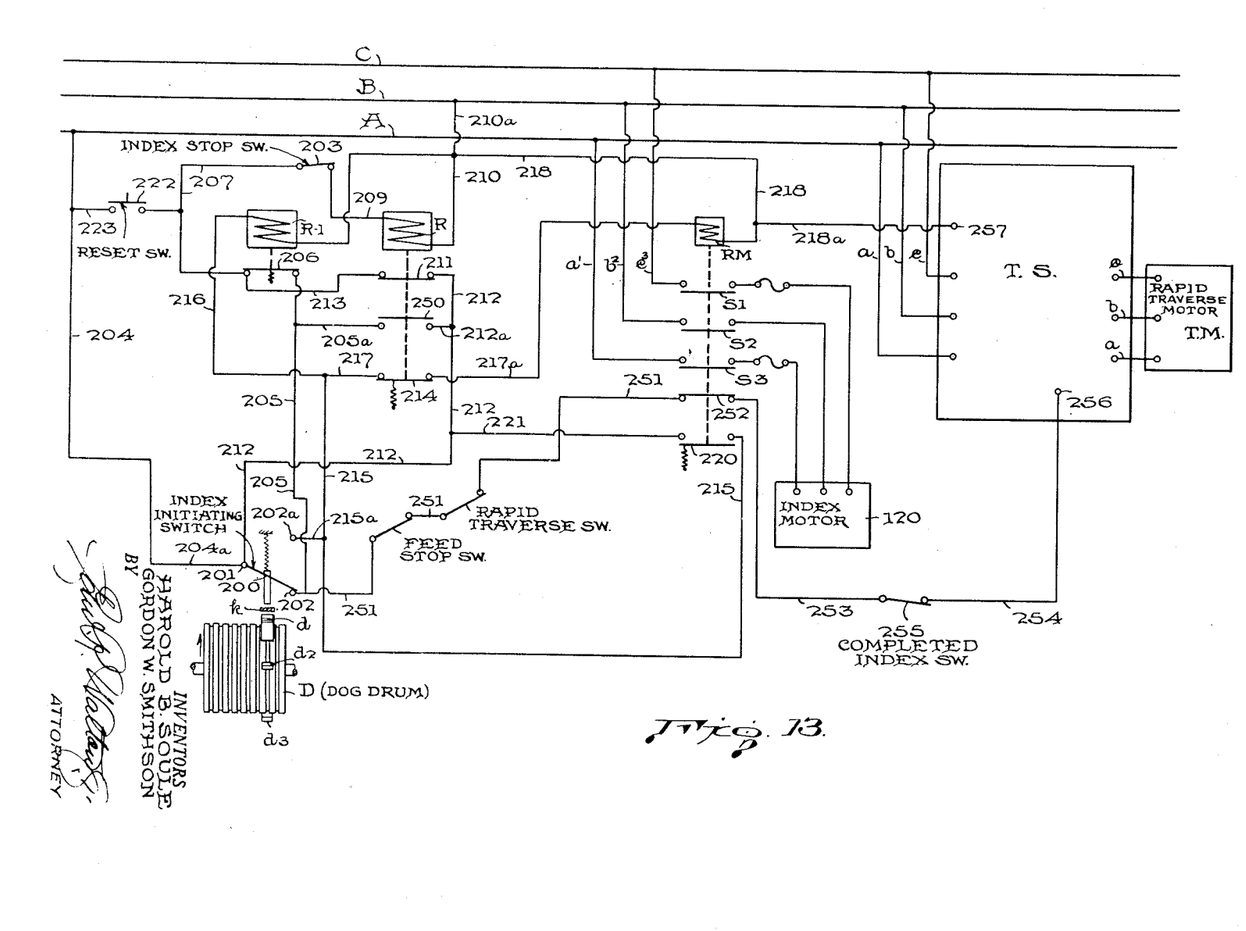
Figure 13 is the circuit layout and wiring diagram of the control.

The present invention provides suitable control means for stopping the indexing motor 120 when the turret has been indexed to the desired position; and this indexing may be to the extent of one or any number of turret faces sequentially or otherwise. In other words, the control may be set accordingly to carry out automatically the indexing of the turret in the manner desired or required without necessarily indexing the turret one face for each reciprocable movement of the turret-slide. As stated, the turret indexing is initiated by the rotatable dog drum D of the machine—which may be of any usual type driven synchronously with the turret-slide movements and preferably from the spindle or the spindle drive (not shown) of the machine in a manner well understood by persons familiar with automatic machine tools and as shown in U. S. Patents Nos. 1,881,928 and 2,357,396, as examples—and is provided with adjustable dogs d that are brought to engage and operate a switch 203 to close it across switch contacts 201 and 202a to establish a circuit to the index motor 120, as shown in Fig. 13 (this switch being normally biased to close across its contacts 201 and 202).

As is most always the case in automatic turret lathes, the turret-slide 102 is brought from its forward feed or cutting positions by a fast motion, usually referred to as "rapid traverse," to its rearmost position for the indexing of the turret, where the turret indexing takes place. This fast motion or rapid traverse of the turret-slide and the motion of its driving parts or mechanism is brought to a stop by the present invention when the indexing of the turret is begun or initiated by the dog d on the dog drum D. On the other hand, the indexing of the turret, and therefore the operation of the indexing motor 120, is stopped by an index-stop-control designated 304 in Figs. 1, 2, 11 and 12 and by the electrical circuits shown in Fig. 13.

Figure 1:
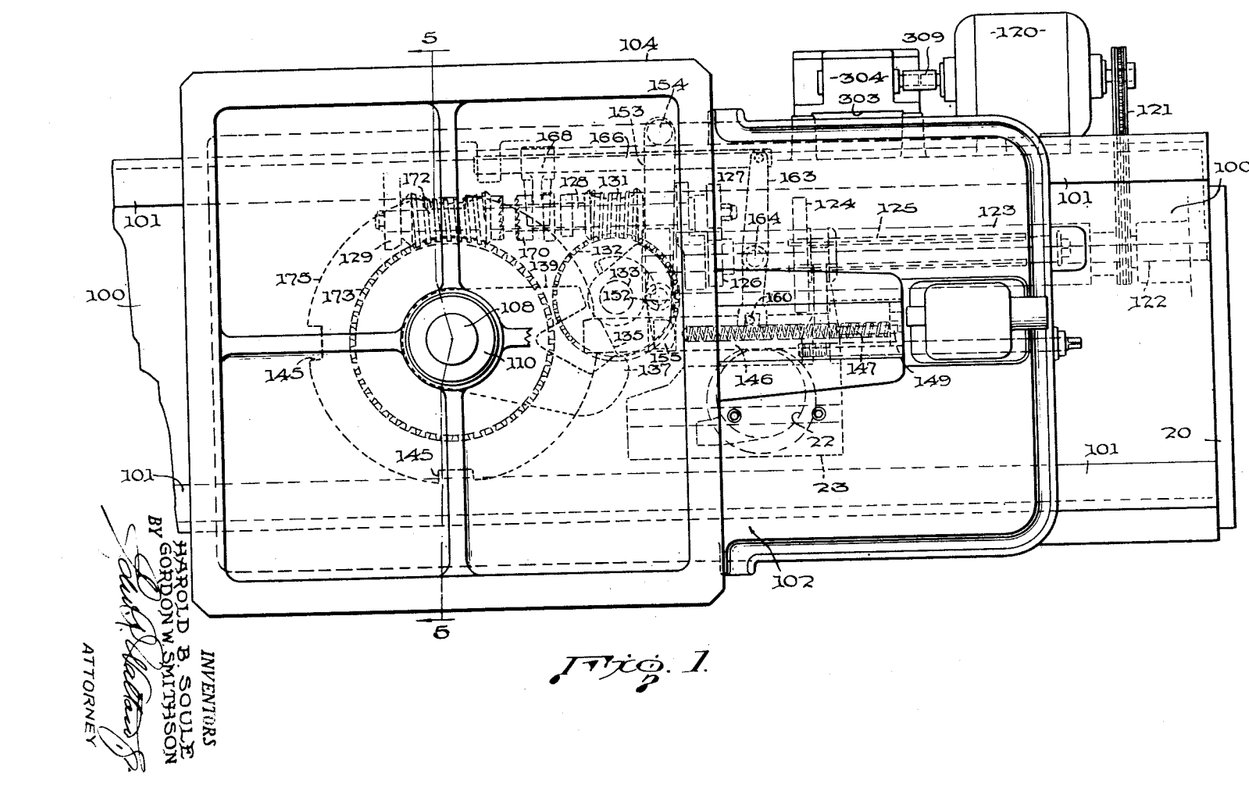
Figure 1 is a plan view of the turret-slide end of a machine tool or turret lathe, in which my invention is incorporated, with the turret-slide mounted thereon, certain parts being broken away and others indicated by dotted lines to more clearly show the construction.
Figure 11:
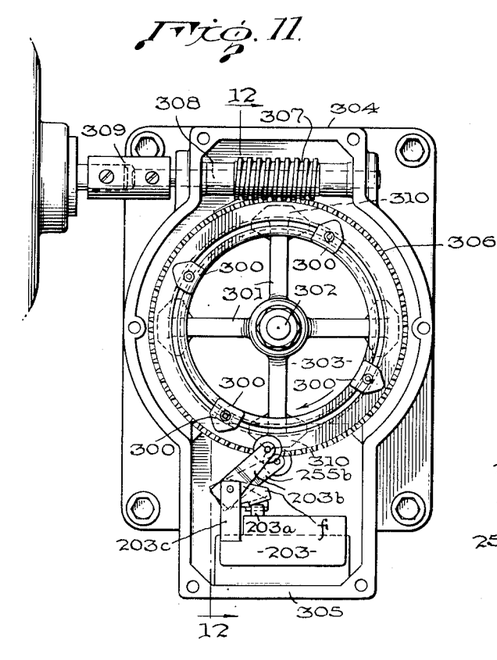
Figure 11 is a side elevation of the assembly of control dog-wheel and its drive and associated switches of the index control, the outer cover of the assembly housing being removed.
Figure 12:
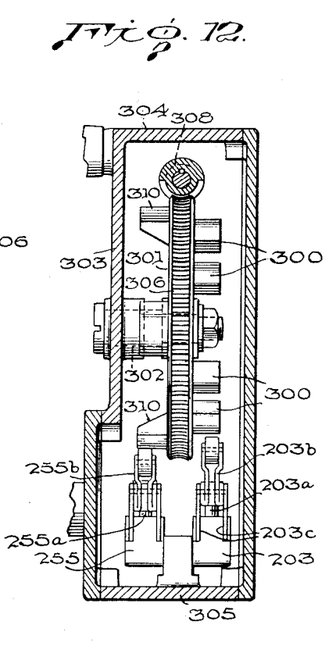
Figure 12 is a sectional view of the device shown in Fig. 11 and is taken on the line 12—12 of Fig. 11.

As best shown in Figs. 11 and 12 the index-stop-control 304 comprises a casing in which is disposed a dog wheel 301 rotatably mounted on a stud shaft 302 fixed to the wall 303 of the casing which is supported on the base 20 of the machine. An index-stop-switch 203, of the push button type, is mounted on the base 305 of the casing 304 and has its button portion 203a actuated by an arm 203b pivoted in a bracket 203c. The arm 203b has a finger f arranged to depress the button 203a to open the switch 203, when arm 203b is operated by a dog 300 on dog wheel 301, and releases said button 203a to close switch 203, when arm 203b is not being effectively operated by said dog or dogs 300. Dog wheel 301 is formed with worm gear teeth 306 and is rotated by the index motor through a worm 307 fixed to a shaft 308 which is coupled, as at 309, to the shaft of index motor 120. One or more of the dogs 300 may be adjustably secured on and about the dog wheel 301 as are desired (but not more than there are turret faces or turret indexing positions on a given machine). There are four (4) of such dogs 300 shown in Figs. 11 and 12 because the turret 104 is shown in Fig. 1 as having four (4) faces; however, as just stated, a less number of dogs 300 may be provided, when setting-up the machine, according to the number of index positions of the turret that are to be employed during the cycle of the machine for a given working operation during said cycle. The drive for indexing the turret and the dog wheel 301 and their drives (both from the motor 120) are so relatively proportioned and synchronized that, for one complete revolution of the dog wheel 301, the turret is also rotated a full revolution; that is, the turret is indexed through all intermediate index stations and back to the initial index station. By providing and properly adjusting one or more index-stopping-dogs 300 on and about the dog wheel 301, the index motor may be stopped and the indexing of the turret discontinued at any preselected one or successive faces or stations of the turret for performing work or cutting operations.

Obviously, if only one dog 300 is provided on the dog wheel 301 and the index motor 120 is started, the turret would be indexed through as many faces or indexed positions according to the position of said single index-stop-dog 300 on said wheel 301 before the index motor 120 is stopped. Thus, in the present invention it is possible to skip one or more faces of the turret when indexing the turret 104 and while the turret-slide 102 is at rest.

When skipping turret faces, as just explained, the index motor 120 will continue operation until stopped by an indexing-stop-dog 300; and in such event, the lock bolt 146 will enter its notch 145 at each index station and, through lever 163 and slide rod 166, will momentarily disconnect clutch 170—171, but, since the index motor 120 is still running and its drive connection (above described) is still rotating said worm 131 and cams 135, 136, and 151, the binding nut 114 will bind and unbind the turret and then the lock bolt 146 will be withdrawn, which latter movement of said lock bolt 146 will again actuate lever 163 and rod 166 to engage clutch 170—171 to further index the turret—and so on—thus skipping one or more turret faces, as is obvious, until a dog 300 on wheel 301 opens switch 203 to de-energize index motor 120.

Also provided on the dog wheel 301 are "completed-index" dogs 310, and in the broad aspect of the invention, there being at least as many such dogs 310 as there are dogs 300 to contact a switch arm 255b to close a switch 255 to rapid traverse motor TM starting the latter, after indexing of the turret has been discontinued. However, in the present embodiment of the invention, as shown, there are as many "completed index" dogs 310 fixed on the dog wheel 301 as there are turret faces or index positions or stations of the turret, one of said dogs being located on the dog wheel to correspond with each index position of the turret, respectively, and are adapted to contact switch arm 255b to close a rapid traverse safety switch 255 after each turret index position or station has been reached (and said turret locked and bound as above described) so as to allow the rapid traverse motor TM to operate the driving mechanism of the turret slide 102 (not shown, but well known in the art) and, consequently, the cam drum 21 and the dog drum D; but, should there be no index-stop-dog 300 on wheel 301 at any turret index position or station just preceding a dog 310, the closing of switch 255 is ineffective to start the rapid traverse drive or motor TM and the indexing of the turret continues. The operation of the dogs 310 upon switch 255 will be later described. Switch 255 is identical with switch 203 and its detailed construction need not be repeated except that the push button 255a of switch 255 closes said switch 255, when depressed by the arm 255b being engaged by a dog 310, whereas such operation of push button 203a opens switch 203. In the present embodiment, the "completed-index" dogs 310 may remain in position on the dog wheel 301 and therefore are referred to as fixed, while index-stop dogs 300 may be omitted and replaced on the wheel 301 according to the set-up of any given operation of the machine.

Operation of control

With the contacts 201 and 202 closed by index-initiating-switch 200 (see Fig. 13), as when this switch is not being operated by dog d of dog drum D (i. e., while the turret-slide 102 is performing certain of its operations as when in its feed movements or is in its rapid traverse motions to and from its feed positions and a dog 310 on dog wheel 301 is holding completed-index-switch 255 closed), the current passes from power line A through conductors 204, 204a, switch contacts 201, 202, conductor 251, normally closed interlock switch 252, conductor 253, "completed-index" switch 255, conductor 254, terminal 256 of switch-box TS of the rapid traverse motor TM and from the other terminal 257 of said switch-box TS through conductors 218a, 218 and 210a to power line B, and, since rapid traverse motor TM is fed by lines a, b and c from power lines A, B and C, respectively, through switch-box TS, rapid traverse motor TM is operating cam drum 21 and dog drum D and, consequently, the turret-slide 102 is being reciprocated on its ways 101. It may be noted that a "feed stop" switch and main "rapid traverse" switch, and possibly others, may be interposed in conductor 251 and controlled by the dog drum D or manually, or both, for purposes well understood in the art but they are not a part of the present invention. Moreover, when switch 200 is closing contacts 201 and 202, as just mentioned and as shown, current passes from conductors 251 and 205, normally closed interlock switch 206, conductor 207, normally closed indexing-stop-switch 203, conductor 209, relay R and conductors 210 and 210a to the other power line B, thus energizing control relay R.

When energized, relay R closes (as shown) a normally open interlock switch 211 and thereby establishes a holding circuit to this relay R, which circuit by-passes switch 200, and current flows from line A through conductors 204, 204a, 212, closed interlock 211 and thence through conductor 213 to conductor 207, which, as stated, is connected through normally closed index-stop switch 203 and relay R to power line B. Relay R, when energized, also opens interlock switch 250 in said by-pass circuit to the rapid traverse motor TM and, further, closes an interlock switch 214 in a circuit to an index-motor-starting relay RM, thus conditioning said latter circuit to energize relay RM when index-initiating switch 200 is thrown to close contacts 201—202a.

As above stated and with the control in this position as shown in Fig. 13, the turret-slide 102 is either in its feed motion or, if the rapid traverse motor TM is running, is in its rapid traverse motion, unless said slide has been otherwise stopped by other means not shown. Now assuming the turret slide is in rapid traverse motion and moving toward its rearmost or turret indexing position and just as said position is reached, a dog d on dog drum D throws index-initiating switch 200 to open contacts 201 and 202 and to close contacts 201—202a, thereby energizing index motor relay RM (while relay R is still held energized by its holding circuit), the current passing through conductors 204, 204a, switch contacts 201, 202a, conductors 215a, 215, 217, switch 214, and conductor 217a to relay RM and thence through conductors 218 and 210a to the other power line B; and, at the same time, by said operation of index-initiating switch 200, a relay R-1 is energized to open the direct circuit to control relay R (through contacts 201 and 202, conductors 205 and 207, index stop switch 203 and conductor 209) without breaking its holding circuit so that, after relay R is de-energized by opening of index-stop switch 203, and its holding circuit broken, relay R cannot be re-energized—and thereby condition the index relay RM or permit power operation of the index motor 120—until the dog d on dog drum D or manually operated key k has released index-initiating switch 200 from contacts 201 and 202a and switch 200 has returned to bridging contact with contacts 201 and 202.

Relay RM, now being energized, closes normally open switches $S^1$, $S^2$ and $S^3$ in the power line to the index motor 120 and starts it, there being three conductors $a^1$, $b^2$ and $c^3$ leading respectively from the three power lines A, B and C to said motor 120, and said switches $S^1$, $S^2$ and $S^3$ being in each of the conductors. Relay RM, when so energized, also opens another interlock 252 in the circuit of the rapid traverse motor RTM stopping said motor, if running, and also closes an interlock switch 220 that establishes a holding circuit through relays RM and R-1 around switch 200 should the dog d on dog drum D overrun and release switch 200 from bridging contact with contacts 200 and 202a, said holding circuit including conductors 204a, 212, 221 leading to one side of switch 220 (now closed) and conductor 215 leading from the other side of the switch 220 to conductor 217 than through closed switch 214 and conductor 217a to the relay RM and also through conductor 216 to relay R-1. Thus, relay RM will remain energized so long as relay R is energized and conditioning interlock switch 214 remains closed after index-initiating switch 200 has bridged contacts 201 and 202a, even though contacts 201 and 202a of switch 200 are disconnected by overrunning of the dog drum D; and relay R-1 remains energized so long as relay RM is energized or as long as switch 200 remains in bridging contact with contacts 201 and 202a so as to prevent re-energization of relay R, after each opening and closing operation of index-stop switch 203, until index initiating switch 200 has again bridged contacts 201 and 202. Also, just as the turret indexing motor 120 is started, it rotates dog-wheel 300 to move a dog 310 out of contact with switch arm 255b, thus releasing "completed index switch" 255 and allowing it to open. The switch 255 remains open until operated by the next dog 310 at the completion of the turret index, which has just now begun.

The index motor 120 will now continue to run as long as relay RM remains energized and turret indexing continues for as many turret faces, positions or stations for which the machine has been "set-up" by the position of dogs 300 on the dog-wheel 301.

Just as each turret indexing operation is completed, a properly adjusted dog 300 opens switch 203 momentarily to allow the following operations and to stop index motor 120—namely, opening switch 203 breaks the circuit to relay R, de-energizing it, which causes holding circuit interlock switch 211 of relay R to open and conditioning switch 214 in the circuit of relay RM to open, thus breaking the holding circuits of these relays R and RM; closes interlock 250 to condition a by-pass circuit to the rapid traverse switch box TS through conductor 212, 212a, 205a, 205, 251, 253, and 254; de-energizing relay RM causes power-line switches $S^1$, $S^2$ and $S^3$ to open cutting-off power to the indexing motor 120; opens interlock 220 breaking the holding circuit to relay RR-1, which de-energizes and closes interlock 206 to condition main feed circuit (204, 204a, 201, 202, 205, 207 and 209) to re-energize relay R when index-stop switch 203 closes and should index-initiating switch 200 be bridging contacts 201 and 202; and also closes conditioning interlock 252 in the rapid traverse motor control circuit—and, with these operations having been completed, the index motor 120 is allowed to coast sufficiently to rotate dog wheel 301 a short distance so as to disengage the dog 300 from the switch operating arm 203b and allow said switch 203 to close and so as to bring a succeeding "completed-index" dog 310 into contact with arm 255b and close "completed index" switch 255 in the rapid traverse motor circuit, said dog wheel 301 coming to rest in this position and maintaining switch 255 closed.

With the relays and switches in the condition just stated, the index motor 120 is stopped and the rapid traverse motor TM is now started and the turret-slide cam drum 21 and the dog drum D start to operate if the dog d of dog drum D has previously released switch 200 to open contacts 201 and 202a and to bridge its contacts 231 and 202 (unless other means, not shown, have caused the machine or the turret-slide movements to stop) and thereby also causing relay R to become re-energized and, consequently, its holding circuit re-established and the switch 214 to again close to condition the circuit to relay RM for the next turret indexing operation to be initiated by the next dog $d^2$ on dog drum D or by manual key k. It should be noted, however, that when switch 203 was opened by dog 300, relay R was momentarily de-energized until dog 300 passed switch arm 203b, but this caused switches 211 and 214 to open breaking the holding circuits to relay R and to the index motor relay RM, so that even after switch 203 has reclosed, as above mentioned, the index motor 120 will not start again until and unless the index-initiating switch 200 has been closed again across contacts 201 and 202a, either by a dog on the dog drum D or by a manually operable key or lever k. However, after relays R and RM were de-energized by the opening and closing of index-stop switch 203, as stated in the preceding paragraph, should the dog d on dog drum D not have released the index-initiating switch 200 to open contacts 201 and 202a and bridge contacts 201 and 202, the relay R-1 will remain energized from contact 202a through conductors 215 and 216 (thus holding interlock 206 open to prevent relay R from becoming re-energized and closing switch 214 and thereby energizing index relay RM to start another index operation) and the circuit to the rapid traverse switch box TS will not have been closed by switch 200; but, since interlock 250 is closed when relay R is de-energized, current may pass through by-pass circuit (204a, 212, 212a, 250, 205a, 205) to conductor 251 of the circuit to the rapid traverse switch box TS (as interlock 252 and "completed index" switch 255 are now closed) to start rapid traverse motor to operate and thereby cause dog drum D to move dog d to release switch 200 so as to bridge contacts 201 and 202, whereby relay R is re-energized, relay R-1 de-energized and rapid traverse motor TM continues to run until another turret indexing operation is initiated by a dog on dog drum D or manual key k or other controls of the machine (not shown) are brought into play.

In the event of power failure before an indexing operation has been completed, and switch 200 is still bridging contacts 201 and 202a power may be restored to relay R by closing a manually operable reset push-button switch 222 in a conductor 223 connecting conductor 204 to conductor 207, and hence to relay R. Energizing relay R closes interlock 214 which completes the circuit to index relay RM (if switch 200 is bridging contacts 201 and 202a) thus starting the index. If power fails before an indexing operation has been completed, and switch 200 is bridging contacts 201 and 202, relay R is automatically energized, when power is restored, and operating switch 200 manually will restart the index as before described. It will be observed that the above described safety controls provide against the index motor 120 being started while the rapid traverse motor TM is running and vice versa because—since relays R and RM are energized when the index motor 120 is running and switches 250 and 252 are held open, as explained above—the rapid traverse motor circuit will remain open even though "completed-index" switch 255 becomes closed and that the closing of the circuit to the rapid traverse motor switch box TS requires the de-energizing of relay R to open interlock 214, which de-energizes relay RM to close interlock 252 in the rapid traverse control circuit.

Conversely, as soon as the index motor 120 starts and indexing operation begins, the dog wheel 301 moves the "completed-index" dog 310 from the "completed-index" switch 225, thus opening said switch and preventing actuation of the rapid traverse motor until "completed-index" switch 255 is again closed by one of the dogs 310 on the dog wheel 301, after a de-energization of relays R and RM.

While the disclosure herein is shown for convenience in connection with a four (4) faced turret 104, it can be applied to machines having turrets of more or less faces, but an advantage of the present invention is that the manufacturer may make a machine of one size with the usual maximum number of turret faces—which is usually six faces—because the dog wheel 301 can be set up with only the proper number of dogs 300 in order that the turret will be indexed to use only the number of turret faces as the tooling of the machine requires. The same turret face can be brought to the spindle a second time or more by merely omitting dog d from dog drum D. Also the lock-bolt disc 107, as well as the worms 131 and 172 and their worm wheels 132 and 173, respectively, may be replaced from stock without requirement of any re-machining of the turret bore or turret faces as is now the case, particularly with Geneva type indexing mechanisms.

It is to be understood that the specific embodiment of the present invention as herein shown and described is for the purpose of showing one (and at the present time the preferred) example thereof because the invention is capable of modification without departing from the spirit and principle thereof and that the invention is not to be limited except by the scope of the appended claims.

That which is claimed, as new, is:

1. A turret indexing and locking mechanism for machine tools comprising, in combination, a reciprocable turret support, a drive means for reciprocating said support, a turret rotatably mounted on said support for movement to successive indexed positions, a gear fast on said turret, a controlled source of power for driving said gear at a selected and predetermined time, a lock bolt engageable with said turret, a driving connection between said source of power and said gear including a clutch, a clutch shifting device connected to said clutch and operable to engage and to disengage said clutch, a rotary camming mechanism driven from said last mentioned driving connection to operate said clutch shifting device to engage said clutch, biasing means acting upon said clutch shifting device to normally hold said clutch in disengaged position and said lock bolt in engaged position, and a control member on and rotatable with the turret and engaging said clutch shifting device to prevent disengagement of the clutch except at predetermined times.

2. A turret indexing and locking mechanism as set forth in claim 1, wherein the clutch shifting device includes the lock bolt as one of its operating members, and the control member has a circular perimeter against which the lock bolt yieldingly rides and further has circumferentially spaced notches therein into which said bolt is projected by said biasing means, whereby movement of said lock bolt into a notch disengages said clutch and stops said index movement of said turret.

3. A turret indexing and locking mechanism as set forth in claim 1, wherein the under surface of the turret rotatably rests upon a seat on the turret support, a stud shaft extending axially from said turret through an opening in said support and having a binding nut on its extended end portion to bear against the said support to bind said turret upon its seat, cam engaging fingers fixed for movement with said nut and projecting into the path of cams on said camming mechanism and positioned to be alternately engaged and disengaged to rotate said nut in opposite directions, whereby the turret may be bound or unbound when said clutch is disengaged or engaged, respectively.

4. In a turret indexing and locking mechanism for a machine-tool and in combination, a turret support; a turret rotatably mounted on said support, a gear connected with the turret to rotate in unison therewith, a motor, a lock bolt engageable with said turret, a driving connection between said motor and gear for rotating the turret and including a clutch, a rotatable cam device operable to engage and to disengage said clutch, mechanism driven at selected times by said motor and including means to operate said device, when so driven, to engage the clutch and simultaneously disengage said lock bolt, other means engaging said device and adapted to operate said device to disengage the clutch and engage said lock bolt, and a control member rotatable with the turret and engaging said device and controlling movement of said device into clutch disengaging position.

5. In a turret indexing and locking mechanism for a machine tool and in combination, a turret support, a turret rotatably mounted on said support, a gear, a locking disc, a locking bolt therefor, said turret, said gear and said locking disc being connected to rotate in unison, said locking disc having bolt receiving notches therein, an indexing motor, a driving connection between said motor and gear for rotating the turret and locking disc and including a clutch, a clutch shifting device connected to said clutch and including said locking bolt shiftable into and out of the notches of the locking disc, camming mechanism driven from said driving connection to said gear and operating said device to engage the clutch and to shift said locking bolt out of locking engagement with said locking disc, and means engaging said device and adapted to operate said device to disengage said clutch and to project said locking bolt into a notch of the locking disc when a notch of the locking disc is in alignment with the locking bolt.

6. In a turret indexing and locking mechanism for a machine tool, and in combination, a turret support, a turret rotatably mounted on said support, a gear, a locking disc, said turret, said gear and said locking disc being connected for rotation in unison, said locking disc having bolt receiving notches therein, a locking bolt mounted to be moved into and out of said notches, means engaging the bolt and biasing the bolt to move into a notch of the locking disc when a notch is in alignment with the bolt, an indexing motor, a rotary camming mechanism driven by the motor to actuate the locking bolt to move said bolt out of a notch of the locking disc, a driving connection between said motor and gear for rotating the turret and locking disc and including a clutch, and a clutch shifting device connected to said clutch and operated by said locking bolt whereby, when the locking bolt is moved out of a notch of the locking disc, the clutch is engaged to cause the turret and locking disc to be driven by said motor and, when the locking bolt is projected into a notch of the locking disc, the clutch is disengaged to interrupt the drive connection between the motor and the turret and locking disc.

7. In a turret indexing mechanism for a machine tool and in combination, a turret support, a turret rotatably mounted on said support, binding means engaging the turret and the support and adjustable to bind the turret against the support and adjustable to unbind the turret from said support, a gear connected with the turret to rotate in unison thereby, a source of indexing power, a driving connection between said source of power and said gear for rotating the turret, said connection including a clutch, an adjusting connection between said driving connection and said adjustable binding means for adjusting said binding means to bind the turret and to unbind the turret from the support, a rotary camming device operatively connected to said clutch to engage and disengage said clutch, mechanism driven by said driving connection to operate said device to engage the clutch, and means engaging said device to operate said device to disengage said clutch.

8. In a turret indexing and locking mechanism for a machine tool and in combination, a turret support, a turret rotatably mounted on said support, binding means engaging the turret and support and adjustable to bind the turret against the support and adjustable to unbind the turret from the support, a locking disc having bolt receiving notches and connected to the turret to rotate in unison therewith, a locking bolt shiftable into and out of the notches of the locking disc, means engaging the bolt and adapted to project the bolt into said notches, operating driving connections from a common source to the turret to rotate the turret and to the binding means to adjust the binding means and to the locking bolt to retract the locking bolt, the connection to the turret including an adjustable clutch, and a connection including a rotating camming device between the clutch and the locking bolt to retract the locking bolt and engage the clutch whereby when the clutch is engaged a driving connection to the turret is established and, when the locking bolt enters a notch, the clutch is disengaged to break said driving connection.

HAROLD B. SOULE.
GORDON W. SMITHSON.

References Cited in the file of this patent

UNITED STATES PATENTS

| Number | Name | Date |
|---|---|---|
| 368,533 | Johnston | Aug. 16, 1887 |
| 1,074,561 | Potter et al. | Sept. 30, 1913 |
| 1,233,854 | Eaton | July 17, 1917 |
| 1,439,871 | Coulter | Dec. 26, 1922 |
| 1,484,603 | Chapman | Feb. 19, 1924 |
| 1,658,242 | Hunter | Feb. 7, 1928 |
| 1,748,540 | Curtis | Feb. 25, 1930 |
| 1,813,484 | Class | July 7, 1931 |
| 2,255,739 | Curtis | Sept. 9, 1941 |
| 2,334,544 | Curtis | Nov. 16, 1943 |
| 2,358,503 | Godfriaux | Sept. 19, 1944 |